UNITED STATES PATENT OFFICE.

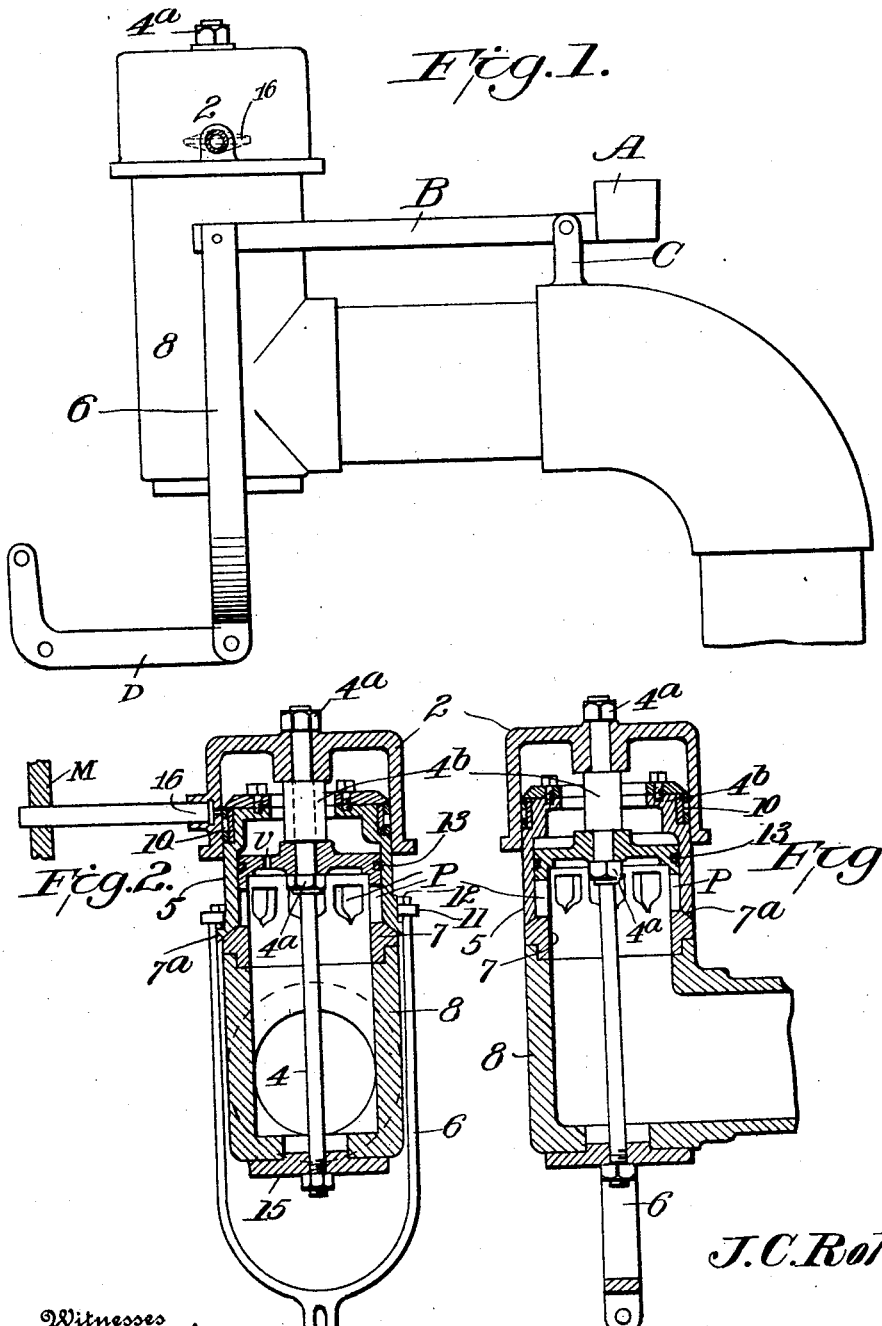

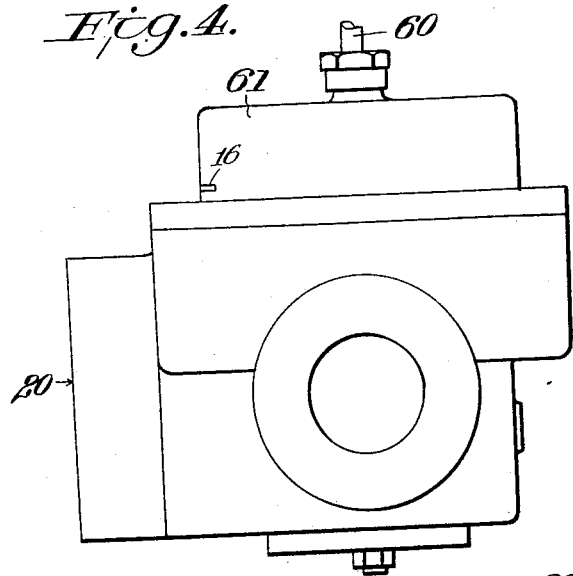
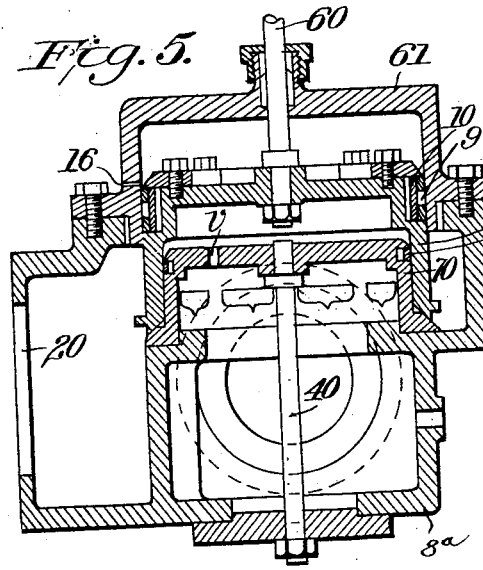
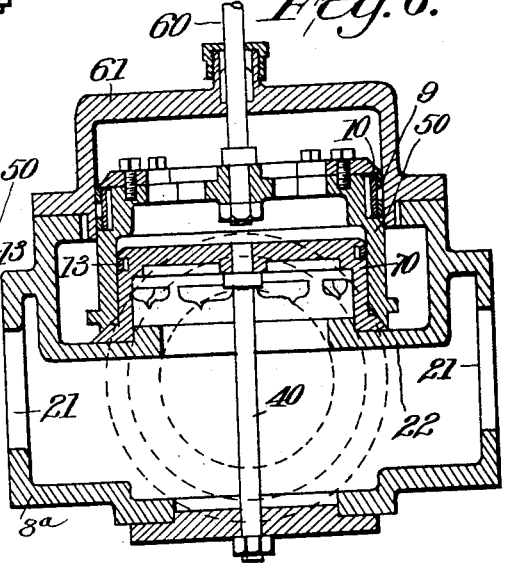

JOSEPH C. ROHE, OF DANVILLE, ILLINOIS, ASSIGNOR OF ONE-HALF TO JOHN P. CURRY, OF DANVILLE, ILLINOIS.

THROTTLE-VALVE.

1,108,239.
Specification of Letters Patent. Patented Aug. 25, 1914.
Application filed July 3, 1913. Serial No. 777,254.

*To all whom it may concern:*

Be it known that I, JOSEPH C. ROHE, a citizen of the United States, residing at Danville, in the county of Vermilion and State of Illinois, have invented certain new and useful Improvements in Throttle-Valves, of which the following is a specification.

This invention relates to throttle valves, and has for its object to provide an improved throttle valve that may be used for locomotive, hoisting, or other engine practice.

The object of the invention is to provide an improved balanced throttle valve adapted for various pressures, and capable of easy operation under all conditions.

The invention is also characterized by certain improvements in the details of the valve, as will more fully appear from the following description and the accompanying drawings.

In the drawings—Figure 1 is a side elevation of a valve suitable for locomotive use. Figs. 2 and 3 are vertical sections thereof at right angles to each other. Fig. 4 is a side elevation of a valve suitable for hoisting engine use. Figs. 5 and 6 are vertical sectional views thereof at right angles to each other.

Referring specifically to Figs. 1, 2 and 3 of the drawings, 8 indicates the dry pipe which will be located in the steam dome M of the locomotive as usual. This pipe has at its upper end a valve seat or head 7 which has side ports P and the top of which is closed, except for a small vent V. Above this head is a cap 2 which is closed except for a vent 16 from which a pipe will extend to atmosphere or other exhaust. The pipe, head and cap are held in position by a rod 4, nuts 4ª thereon and a spacing collar 4ᵇ between the cap and head. A sleeve 5 which forms the movable valve member, is slidable up and down on the head 7, to open and close the ports P. The lower end of the sleeve seats against the valve seat 7ª, and the upper end of the sleeve fits within the cap 2. Packing 13 is provided between the head and the sleeve, on the inner side of the latter and packing 10 is provided between the sleeve and the cap, on the outer side of the sleeve, so as to provide steam tight joints between the head, the sleeve and the cap.

The sleeve 5 is opened or closed by means of a suitable operating rod (not shown) connected to a lever D which is connected by a yoke 6 to pins 11 on the side of the sleeve 5, and a weight A connected to said pins by a forked lever B fulcrumed at C, may be used to assist the operation of the valve.

The ports P are tapered or formed with a notch at the lower edge, so that a small amount of steam may be admitted, if desired, by a slight lift of the sleeve. The vent 16 is so located that it is open to the space within the cap when the valve is closed, but when the valve is opened said vent is cut off. Steam pressure within the cap 2 is exhausted when the valve is closed, by means of the vent 16 which leads to atmosphere through the wall of the dome M, the dry pipe being also exhausted under such conditions by the vent V.

When the sleeve 5 is lifted to open the valve the vent 16 is cut off, and steam entering the dry pipe through the ports P also passes through the vent V into the space in the cap above the valve whereby the pressure on all sides of the sleeve 5 is equalized or balanced, and it may be freely moved. When said valve is closed against the seat 7ª the ports P are closed and the vent 16 is opened, which exhausts the pressure from the cap as above stated. The vent 16 is quite small or narrow vertically and wide laterally, so that a slight rise of the sleeve 5 closes the same and balances the sleeve.

In the form shown in Figs. 4, 5 and 6 substantially the same arrangement is provided, except that the valve casing or pipe 8ª is changed to suit an outside valve, the inlet to the casing being indicated at 20 and a pair of outlets 21 with a diaphragm 22 between them contains an opening over which the head 70 rests, and is held in position by a screw rod 40, and the sleeve 50 works on the head, to open and close the ports, said sleeve being operated by a rod 60 which works through a gland in the top of the cap 61 which is fastened to the valve body. The head 70 has the vent V, and cap 61 has the vent 16 to atmosphere, in the same relation as above described, and when the sleeve is raised or lowered the operation is identical with that described above in connection with the locomotive valve.

The invention is not limited to the exact embodiment shown, but may be varied in many ways within the scope thereof. Particularly, the operating devices for the sleeve may be varied as desired. The vent 16 is of greater area than the vent V, so the pressure in the cap will rapidly exhaust when the valve is closed.

What I claim as new is:

1. A throttle valve comprising a hollow head provided with side ports, and a vent in the top thereof, a cap above said head, provided with an exhaust vent, and a sleeve slidable on the head and within the cap and adapted to open and close said ports and the exhaust vent in the cap, substantially as described.

2. A throttle valve comprising a hollow head provided with ports in the side thereof and a vent in the top thereof, a cap spaced above said head and having an exhaust vent in the side thereof, and a sleeve the lower end of which fits around said head and the upper end of which fits within said cap, the sleeve being movable up and down to open the ports and close the exhaust vent and vice versa.

3. A throttle valve comprising a hollow head provided with ports in the side thereof and a vent in the top thereof, a cap spaced above said head and having an exhaust vent in the side thereof, and a sleeve the lower end of which fits around said head and the upper end of which fits within said cap, the sleeve being movable up and down to open the ports and close the exhaust vent and vice versa, the area of the vent in the top of the head being less than that of the exhaust vent.

4. A throttle valve comprising a hollow head provided with ports, a cap spaced from said head, and a sleeve fitting at one end around the head and within the cap at the other end and movable to open or close the ports, and a passage between the interior of the head and the interior of the cap, to equalize the pressure therein, the cap having a vent to exhaust pressure from the cap when the ports are closed.

In testimony whereof, I affix my signature in presence of two witnesses.

JOSEPH C. ROHE.

Witnesses:
  M. F. KEEGAN,
  G. D. GRINER.

---

Copies of this patent may be obtained for five cents each, by addressing the "Commissioner of Patents, Washington, D. C."